United States Patent [19]

Urban et al.

[11] Patent Number: 5,755,872
[45] Date of Patent: May 26, 1998

[54] PROCESS FOR PREPARING QUINACRIDONE PIGMENTS

[75] Inventors: Manfred Urban, Wiesbaden; Dieter Schnaitmann, Eppstein; Martin Böhmer, Neu-Anspach, all of Germany

[73] Assignee: Hoechst Aktiengesellschaft, Frankfurt, Germany

[21] Appl. No.: 834,728

[22] Filed: Apr. 1, 1997

[30] Foreign Application Priority Data

Apr. 2, 1996 [DE] Germany .................. 196 13 186.3

[51] Int. Cl.⁶ .................................................. C09B 67/52
[52] U.S. Cl. ..................... 106/495; 106/493; 106/494; 106/497; 546/49; 546/56
[58] Field of Search ......................... 106/493, 494, 106/495, 497; 545/49, 56

[56] References Cited

U.S. PATENT DOCUMENTS

| | | | |
|---|---|---|---|
| 3,160,510 | 12/1964 | Ehrich | 106/495 |
| 3,256,285 | 6/1966 | Fuchs et al. | 546/28 |
| 3,257,405 | 6/1966 | Gerson et al. | 546/49 |
| 4,310,359 | 1/1982 | Ehashi et al. | 106/494 |
| 4,455,173 | 6/1984 | Jaffe | 106/495 |
| 5,491,235 | 2/1996 | Campos et al. | 546/57 |
| 5,591,258 | 1/1997 | Urban et al. | 106/497 |

FOREIGN PATENT DOCUMENTS

| | | |
|---|---|---|
| 0069396 | 1/1983 | European Pat. Off. . |
| 0655485 | 5/1995 | European Pat. Off. . |
| 0682090 | 11/1995 | European Pat. Off. . |
| 1150046 | 12/1963 | Germany . |
| 1184881 | 9/1965 | Germany . |
| 1181159 | 12/1967 | Germany . |
| 1261106 | 8/1968 | Germany . |
| 3106906 | 5/1990 | Germany . |
| 0951451 | 3/1964 | United Kingdom . |
| 1002641 | 8/1965 | United Kingdom . |

*Primary Examiner*—Mark L. Bell
*Assistant Examiner*—Scott L. Hertzog
*Attorney, Agent, or Firm*—Connolly and Hutz

[57] ABSTRACT

A process for preparing quinacridone pigments

A process for preparing pigments, mixed crystal pigments and pigment preparations based on linear unsubstituted or substituted quinacridones of the formula (I)

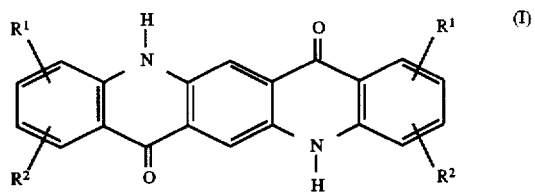

in which the substituents $R^1$ and $R^2$ are identical or different and are hydrogen, chlorine, bromine or fluorine atoms or are $C_1$–$C_4$-alkyl, $C_1$–$C_4$-alkoxy or carboxamido groups which may be substituted by $C_1$–$C_6$-alkyl groups; or are phenoxy or $C_6$–$C_{10}$-aryl rings onto which further aromatic, aliphatic or heterocyclic rings can be fused, which process comprises hydrolyzing the reaction mixture resulting from cyclization of the respective dianilinoterephthalic acid with polyphosphoric acid or polyphosphate at a temperature of or above 110° C. with water or an aqueous mineral acid solution and then isolating the pigments thus obtained directly; or subjecting the resulting prepigments, if desired after addition of organic solvents, to a finishing treatment and isolating the pigments; or subjecting the resulting coarsely crystalline crude pigments to fine dispersion and then isolating the pigments; or subjecting the prepigments obtained after fine dispersion, if desired after addition of solvents, to a finishing treatment and isolating the pigments.

This gives quinacridone pigments having excellent coloristic and rheological properties.

16 Claims, No Drawings

PROCESS FOR PREPARING QUINACRIDONE PIGMENTS

A process for preparing quinacridone pigments

The present invention relates to a particularly environmentally safe and economical process for preparing quinacridone pigments. These pigments include linear unsubstituted and substituted quinacridone pigments as well as mixtures, pigment preparations and mixed crystals based on these pigments.

Quinacridone pigments have been known for a long time. In practical application, their fastness properties and coloristic properties must meet high demands. Accordingly, the preparation process and fine dispersion process are of great importance. Quinacridone pigments can be prepared by two preferred synthetic routes. Their preparation on an industrial scale takes place by oxidation of dihydroquinacridones in alkaline medium in the presence of solvents, followed by dry or wet milling of the coarsely crystalline crude pigments obtained or by ring closure of 2,5-dianilinoterephthalic acid in polyphosphoric acid or polyphosphates, followed by phase change and finishing of the finely divided crude pigments obtained using organic solvents. Depending on the synthetic route used, the crude pigments are obtained either in finely divided or in coarsely crystalline form. The crude pigments obtained in finely divided form need not be subjected to fine dispersion prior to the finishing treatment, whereas the crude pigments obtained in coarsely crystalline form must be subjected to fine dispersion prior to the finishing treatment. Examples of such fine dispersion methods include acid pasting, dry milling and wet milling methods. Combinations of these methods are also described.

The preparation of quinacridone pigments, pigment preparations and mixed crystal pigments is described in the literature listed below: GB-A-951,451 describes a process for preparing linear unsubstituted β-phase quinacridone pigments by ring closure of 2,5-dianilinoterephthalic acid in polyphosphoric acid or polyphosphates, followed by treatment of the finely divided moist crude α-phase pigments obtained after hydrolysis in ice water. Phase change is carried out in at least the eight-fold amount of an at least 5% alkaline solution, relative to the crude pigment. The finely divided crude β-phase quinacridone pigments are then converted into the pigment form by subjecting them to a solvent finish. This is accompanied by the formation of large amounts of alkali, which pollute the wastewater and make the process uneconomical.

U.S. Pat. No. 3,257,405 describes a process for preparing linear unsubstituted β-phase quinacridone pigments by ring closure of 2,5-dianilinoterephthalic acid in polyphosphoric acid, followed by solvolysis of the reaction mixture. This gives the β-phase pigments directly. This procedure uses large amounts of organic solvent, which have to be separated off from the phosphoric acid/water/solvent mixture and regenerated. This makes the process expensive and ecologically unsafe.

U.S. Pat. No. 5,491,235 describes a process for preparing linear unsubstituted β-phase quinacridone pigments by ring closure of 2,5-dianilinoterephthalic acid in polyphosphoric acid or polyphosphates, followed by solvolysis of the ring-closure mixture. This gives the β-phase pigments directly. The ring closure is carried out with the addition of iron salts. This results in pigments having a particularly deep full blue shade. This process also uses large amounts of organic solvent, which have to be separated off from the phosphoric acid/water/solvent mixture and regenerated. Accordingly, this process, too, is expensive and ecologically unsafe.

U.S. Pat. No. 5,591,258 describes a process for preparing linear unsubstituted β-phase quinacridone pigments by ring closure of 2,5-dianilinoterephthalic acid in polyphosphoric acid or polyphosphate, followed by treatment of the finely divided moist crude α-phase pigments obtained after hydrolysis in ice water with small amounts of alkali and solvent, resulting in conversion into the β-phase and into the pigment form. Advantageously, the finely divided crude α-phase pigments are subjected to dispersion prior to the phase change. The phase change needs to be carried out in an additional step using large amounts of solvent in an alkaline medium. Moreover, the solvents have to be regenerated. This makes the process expensive. The coloristic properties of these pigments do not meet all requirements.

GB-A-1,002,641 describes a process for preparing linear unsubstituted γ-phase quinacridone pigments by ring closure of 2,5-dianilinoterephthalic acid in polyphosphoric acid, followed by hydrolysis in ice water. The crude quinacridones thus obtained are then treated with aqueous alkali, separated off in the form of neutral aqueous pastes, and heated at 120° to 200° C. under pressure. The process is expensive since the finish is carried out in two steps. The fastness properties do not meet today's requirements, in particular in the case of transparent pigments.

U.S. Pat. No. 3,256,285 describes a process for improving the pigment properties of linear substituted quinacridones by ring closure of the substituted dianilinoterephthalic acids in polyphosphoric acid, followed by solvent finish of the moist finely divided crude pigments obtained after hydrolysis at elevated temperature under pressure. This procedure uses large amounts of solvent, which have to be regenerated, thus making the process expensive.

U.S. Pat. No. 3,160,510 describes the preparation of quinacridone mixed crystal pigments by dry milling the crude pigment mixtures with salt, followed by solvent treatment of the removed millbase or by reprecipitation of the pigment mixtures with sulfuric acid, followed by a solvent treatment of the finely divided dried crude pigments. This procedure leads to the formation of large amounts of salt or dilute sulfuric acid, which have to be regenerated. This makes the process uneconomical.

U.S. Pat. No. 4,310,359 describes the preparation of pigment preparations based on sulfonamido- and carboxamido-containing quinacridone compounds.

U.S. Pat. No. 4,455,173 describes the preparation of quinacridone pigment preparations by dry milling of the crude pigments and of the pigment dispersants in the presence of small amounts of inorganic salts, followed by roll-milling in organic solvents. This process is very expensive because it includes a two-step milling process. The solvent milling leads to the formation of large amounts of solvent, which have to be regenerated.

The object of the present invention was to provide an environmentally safe and low-cost process for preparing quinacridone pigments which overcomes the disadvantages of the prior art.

It has been found that quinacridone pigments having excellent coloristic and rheological properties can surprisingly be prepared in high yield and purity by high-temperature hydrolysis of the ring-closure mixtures resulting from cyclization of dianilinoterephthalic acids in polyphosphoric acid or polyphosphates.

The present invention provides a process for preparing pigments, mixed crystal pigments and pigment preparations based on linear unsubstituted or substituted quinacridones of the formula (I)

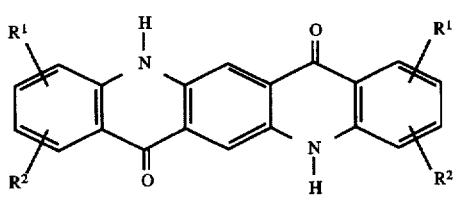

in which the substituents $R^1$ and $R^2$ are identical or different and are hydrogen, chlorine, bromine or fluorine atoms or are $C_1$–$C_4$-alkyl, $C_1$–$C_4$-alkoxy or carboxamido groups which may be substituted by $C_1$–$C_6$-alkyl groups; or are phenoxy or $C_6$–$C_{10}$-aryl rings onto which further aromatic, aliphatic or heterocyclic rings can be fused, which process comprises hydrolyzing the reaction mixture resulting from cyclization of the dianilinoterephthalic acid of the formula (Ia)

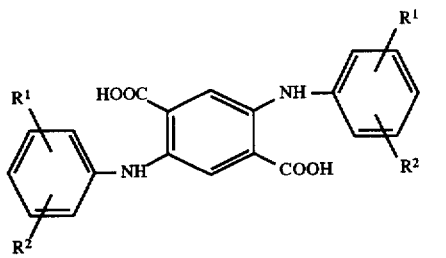

with polyphosphoric acid or polyphosphate, at a temperature of or above 110° C. with water or an aqueous mineral acid solution and then isolating the pigments thus obtained, directly; or subjecting the resulting prepigments, if desired after addition of organic solvents, to a finishing treatment and isolating the pigments; or subjecting the resulting coarsely crystalline crude pigments to fine dispersion and then isolating the pigments; or subjecting the prepigments obtained after fine dispersion, if desired after addition of organic solvents, to a finishing treatment and isolating the pigments.

Radicals $R^1$ and $R^2$ are preferably hydrogen, methyl, chlorine, carboxamido or a combination thereof. The ring-closure agent used for the cyclization reaction is typically polyphosphoric acid or polyphosphate in a 3- to 10-fold amount, preferably in a 3- to 5-fold amount, relative to the weight of the dianilinoterephthalic acid. The $P_2O_5$ content of the polyphosphoric acid or polyphosphate is between 80 and 85% by weight, which corresponds to a phosphoric acid equivalent of 110 to 120%. It is possible to use larger amounts of ring-closure agent, but this is usually not required. The ring-closure temperature is 80° to 150° C., preferably 120° to 140° C. The cyclization reaction time is typically 0.5 to 24 hours, preferably 1 to 2 hours.

The reaction mixtures obtained after cyclization are hydrolyzed at a temperature of or above 110° C., preferably 110° to 180° C., particularly preferably 135° to 165° C., with water or dilute phosphoric acid under pressure. This gives the hydrolysis products either directly as pigments, as prepigments (finely divided crude pigments) or as coarsely crystalline crude pigments. After hydrolysis, the pigments are isolated in the usual manner. The prepigments and the crude pigments must be subjected to an additional aftertreatment. The prepigments are subjected, if desired after intermediate isolation, to a thermal aftertreatment at a temperature of 50° to 200° C. with or without addition of solvents and are then, after removal of the solvent, isolated. The coarsely crystalline crude pigments are subjected to fine dispersion by mechanical means, and the pigments thus obtained are isolated in the usual manner, or the prepigments thus obtained are subjected, if desired after intermediate isolation, to a finishing treatment at a temperature of 50° to 200° C. with or without addition of organic solvents and are then, after removal of the solvents, isolated. Fine dispersion can take place by dry or wet milling. Wet milling with a high energy input is preferred because in this way the crude pigment does not have to be dried.

The process according to the invention elegantly combines hydrolysis, and, if desired, phase change, with finishing. Pigments which can exist in a plurality of phases, for example the unsubstituted linear quinacridone, can be converted directly into the coloristically valuable β-phase without the need for an additional phase change step. Suitable selection of the dianilinoterephthalic acids, the conditions for ring-closure, high-temperature hydrolysis and workup yields useful pigments directly after high-temperature hydrolysis, or first yields prepigments which then have to be subjected to a finishing treatment at elevated temperatures, or first yields coarsely crystalline crude pigments which then have to be subjected to fine dispersion by mechanical means and are then converted directly, or after a finishing treatment, into a useful pigment form.

In order to improve the coloristic properties and to obtain specific coloristic effects, solvents, pigment dispersants, surface-active agents, antifoams, extenders or other additives can be added at any desired stage of the process. Alternatively, mixtures of these additives can be used. The additives can be added all at once or in several portions. The addition can take place before, during or after ring closure, during high-temperature hydrolysis, milling or the finishing treatment or during or after isolation. The best time for this addition has to be determined beforehand by guideline experiments.

The reagent used for hydrolysis is water or dilute mineral acid, preferably dilute orthophosphoric acid. For hydrolysis, the ring-closure mixture is metered under pressure into the water or the dilute mineral acid solution which has a temperature of or above 110° C. However, the order of addition can also be reversed. The high-temperature hydrolysis can be carried out continuously or batchwise. Advantageously, it is carried out continuously in a static mixer. A 2- to 10-fold amount of water or dilute phosphoric acid, relative to the polyphosphoric acid or polyphosphate, is typically used. The relative amounts can vary over a wide range. The duration of hydrolysis depends on the metering rate of the ring-closure melt.

Ring closure and hydrolysis can take place with the addition of solvents, surface-active agents and pigment dispersants. These additives have to be stable under the reaction conditions. It is advantageous to subject the hydrolyzed ring-closure mixture additionally to elevated temperatures, preferably of 120° to 150° C., for 0.5 to 24 hours, preferably 0.5 to 5 hours.

Fine dispersion can be effected by dry or wet milling. All batchwise and continuous vibrating or roll mills are suitable for dry milling, and all batchwise and continuous stirred ball mills, roll mills, vibrating mills and kneaders are suitable for wet milling. For wet milling, the crude pigment suspensions obtained directly, or the moist press cakes obtained after intermediate isolation, or the dried coarsely crystalline crude pigments, are diluted with water to a consistency suitable for milling. The grinding media used include balls made of zirconium oxide, zirconium mixed oxide, alumina, steel or quartz 0.2 to 20 mm in diameter. Stirred ball mills are particularly suitable. For wet milling, a high milling efficiency is advantageous. Examples of stirred ball mills suitable for the desired efficiency are those which are designed for a batchwise or continuous mode of operation and comprise a milling space in horizontal or vertical design which is in the form of a cylinder or a hollow cylinder, and can be operated at a specific energy density of more than 2.5 kW per liter of milling space and with a grinding medium having a diameter of less than 1 mm, the rotational speed of the stirrer being more than 12 m/s. The constructional design ensures that the high milling energy is transferred to the millbase. Suitable milling conditions must be determined by preliminary experiments. Milling is preferably carried out in an aqueous medium and in an alkaline pH range. It can also be carried out in an aqueous medium with addition of small amounts of an organic solvent, preferably of up to 10% by weight, relative to the entire millbase, in a homogeneous mixture. Alternatively, milling can also be carried out in an organic medium.

The pigment concentration of the millbase depends on the rheology of the suspension and is advantageously not more than 30% by weight, preferably 5 to 30% by weight, in particular 5 to 20% by weight, relative to the millbase suspension. Suitable inorganic bases include sodium hydroxide solution, potassium hydroxide solution, sodium carbonate, potassium carbonate, calcium hydroxide and ammonia. Mixtures of the bases mentioned can also be used.

Apart from the liquid phase and the crude pigment, the millbase can also contain pigment dispersants, cationic, anionic or nonionic surfactants, antifoams and additives.

Milling is carried out at temperatures in the range from 0° to 100° C., advantageously at a temperature between 10° and 60° C., preferably at 20° to 50° C.

The milling time is dependent on the fineness requirements of the particular area of application, for example the coatings, printing or plastics sector. The residence time of the millbase in the stirred ball mill depends on the fineness required and is typically between 5 and 150 minutes. A milling time of 5 to 45 minutes, preferably 10 to 30 minutes, has proven to be advantageous. During milling, the phase of the crude pigments used remains intact. After milling, the crude pigments are present in the suspensions as pigments or prepigments.

The prepigments obtained after high-temperature hydrolysis or after fine dispersion are subjected to a finishing treatment in an aqueous suspension, if desired after addition of organic solvents. The conditions to be maintained during the finishing treatment depend largely on the desired properties of the pigments and are in each case matched to these properties. Usually the suspension of the prepigments is subjected in the appropriate medium to a temperature in the range between 50° and 200° C., if desired under elevated pressure, for 1 to 24 hours. In general, the suspension used for this treatment is the one obtained after wet milling without intermediate isolation of the millbase. The amount of solvent added can vary over a wide range. Preferably, the solvent is used in the same amount by weight or up to 5 times the amount by weight of the prepigments. The heat treatment in an aqueous, aqueous-organic or organic medium is conducted at 50° to 150° C. preferably over a period of 1 to 6 hours. After finishing is complete, the solvents used for this treatment can be recovered by distillation and re-used. By utilizing the various possibilities thus available, it is possible to convert the prepigments obtained by the process according to the invention, depending on the intended purpose, into a more hiding or more transparent form or into a different phase, which can be regulated by the type of solvent selected, its concentration, by the temperature selected and by the duration of the finishing treatment.

In order to obtain specific coloristic effects, a treatment with peroxodisulfates can be carried out, preferably at 60° to 100° C., before or after finishing and advantageously after removal of the solvent. This treatment is carried out with addition of 1 to 20% by weight of peroxodisulfate, relative to the pigment. The peroxodisulfate can be added in solid form or as an aqueous-alkaline solution. The amount of alkali consumed by oxidation with peroxodisulfate is compensated by adding alkali before or during oxidation. Compounds suitable for this oxidation include sodium peroxodisulfate, potassium peroxodisulfate and ammonium peroxodisulfate.

Examples of surface-active agents which can be used in the process according to the invention include cationic, anionic and non-ionic surfactants, preferably fatty acid taurides, fatty acid sarcosides, fatty alcohol polyglycol ethers, fatty alcohol polyglycol esters, alkylpolyglycol ether sulfates, alkylphenol polyglycol ethers, alkanesulfonic acids and their salts, alkylphenylsulfonic acids and their salts and alkylphenolpolyglycol ether sulfates.

The pigment dispersants preferably used in the process according to the invention are compounds of the formula (II)

$$P-Xm \qquad (II),$$

in which

P is an m-valent radical of a linear quinacridone of the formula (I), in which $R^1$ and $R^2$ are identical and are hydrogen atoms or methyl groups, X is a group of the formula (III)

$$-COOM \qquad (III)$$

or a group of the formula (IV)

$$-SO_3M \qquad (IV),$$

in which

M is a hydrogen ion $H^+$ or the equivalent $M^{r+}/r$ of an r-valent metal cation, in which r in the relevant case is consistently 1, 2, or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Cd^{2+}$, $Co^{2+}$, $Zn^{2+}$, $Fe^{2+}$, $Al^{3+}$, $Cr^{3+}$ or $Fe^{3+}$; or an ammonium ion having the structure $N^+R^3R^4R^5R^6$, in which the substituents $R^3$, $R^4$, $R^5$ and $R^6$ are each, independently of one another, hydrogen atoms, $C_1$–$C_{30}$-alkyl, $C_2$–$C_{30}$-alkenyl or $C_5$–$C_{30}$-cycloalkyl groups which may be substituted by hydroxyl, di($C_1$–$C_4$-alkyl)amino, carboxyl or carboxamido groups, or X is a group of the formula (V)

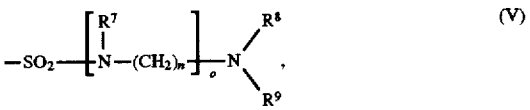

in which $R^8$ and $R^9$ are each, independently of one another, a hydrogen atom, a $C_1$–$C_{20}$-alkyl, $C_2$–$C_{20}$-alkenyl or $C_5$–$C_7$-cycloalkyl group, or in which $R^8$ and $R^9$ together with the adjacent nitrogen atom form an aliphatic or aromatic five- or six-membered heterocyclic system containing in each case 1 to 3 identical or different hetero atoms in the ring selected from the group consisting of nitrogen, oxygen or sulfur; $R^7$ is a hydrogen atom or a $C_1$–$C_4$-alkyl group, n is a number from 1 to 6, o is 0 or 1, or X is a group of the formula (VI)

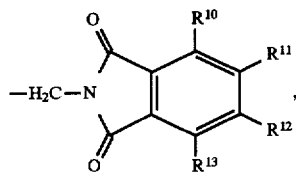
(VI)

in which $R^{10}$, $R^{12}$ and $R^{13}$ are each a hydrogen, fluorine, chlorine or bromine atom and $R^{11}$ is a hydrogen, fluorine, chlorine or bromine atom or a nitro, $C_1$–$C_5$-alkyl, $C_1$–$C_6$-alkoxy or benzoylamino group; and m is a number from 1 to 4.

Preference is given to pigment dispersants of the formula (II) in which P is the radical of an unsubstituted linear quinacridone and X is a phthalimidomethylene group or a sulfonamido group. It is advantageous to add 0.1 to 20% by weight, preferably 3 to 10% by weight, of pigment dispersant per weight unit of pigment, prepigment or crude pigment.

Examples of suitable organic solvents include: alicyclic hydrocarbons, such as, for example, cyclohexane; $C_1$–$C_{18}$-alkanols and alicyclic alcohols, such as, for example, methanol, ethanol, n- or isopropanol, n- or isobutanol, tert-butanol, pentanols, hexanols, cyclohexanol; $C_1$–$C_5$-dialkyl ketones or cyclic ketones, such as, for example, acetone, diethyl ketone, methyl isobutyl ketone, methyl ethyl ketone or cyclohexanone; ethers and glycol ethers, such as, for example, the monomethyl ether or monoethyl ether of ethylene glycol and propylene glycol, butylglycol, ethyidiglycol or methoxybutanol; aromatic hydrocarbons, such as, for example, toluene, xylenes or ethylbenzene, cyclic ethers, such as, for example, tetrahydrofuran, aromatic chlorinated hydrocarbons, such as, for example, chlorobenzene, o-dichlorobenzene, 1,2,4-trichlorobenzene or bromobenzene; substituted aromatics, such as, for example, benzoic acid, nitrobenzene or phenol; aliphatic carboxamides, such as, for example, formamide or dimethylformamide; cyclic carboxamides, such as, for example, N-methylpyrrolidone; $C_1$–$C_4$-alkyl carboxylates, such as, for example, butyl formate, ethyl acetate or propyl propionate, $C_1$–$C_4$-glycol carboxylates, $C_1$–$C_4$-alkyl phthalates and benzoates, such as, for example, ethyl benzoate; heterocyclic bases, such as, for example, pyridine, quinoline, morpholine or picoline; and dimethyl sulfoxide and sulfolane.

Preferred organic solvents are alkanols, in particular ethanol, propanols, butanols and pentanols; aliphatic carboxamides, such as formamide or dimethylformamide; cyclic carboxamides, in particular N-methylpyrrolidone; aromatic hydrocarbons, such as, for example, toluene, xylenes or ethylbenzene; aromatic chlorinated hydrocarbons, such as, for example, chlorobenzene or o-dichlorobenzene.

The preparation of pigments by the process according to the invention has proven to be particularly economical and environmentally safe, since high-temperature hydrolysis yields the hydrolysis products directly as pigments or yields coarsely crystalline crude pigments which can be converted into the pigment form in the absence of solvents by mechanical fine division processes. Thus, in the case of the unsubstituted linear β-phase quinacridone pigments, the additional step of phase change in the presence of large amounts of alkali and solvents can be omitted.

The process according to the invention uses only small amounts of chemicals and solvents, which are then further processed or can be completely regenerated, thus avoiding waste disposal problems. Wet milling of the crude pigments avoids air pollution caused by dust formation.

It was surprising and unforeseeable that in the case of the unsubstituted linear quinacridone pigment, high-temperature hydrolysis of the ring-closure mixture yielded the β-phase directly given that, according to the data in U.S. Pat. No. 5,491,235, pigments could only be obtained in the β-phase by using water-dilutable solvents, possibly with the addition of small amounts of water. According to the data given there, phase mixtures are obtained instead of the pure β-phase even when the water content of the solvent is as low as 50%. The pigments, pigment preparations and mixed crystal pigments obtained after high-temperature hydrolysis exhibit coloristic and rheological properties which cannot be achieved with pigments prepared at a lower hydrolysis temperature.

The pigments obtainable by the present invention are distinguished by their excellent coloristic and Theological properties, in particular by high flocculation stability, easy dispersibility, good gloss performance and high color strength.

The pigments prepared according to the invention can be used for pigmenting high-molecular-weight organic materials of natural or synthetic origin. Examples of high-molecular-weight organic materials which can be pigmented with the pigments mentioned include cellulose ethers and cellulose esters, such as ethylcellulose, nitrocellulose, cellulose acetate or cellulose butyrate, natural resins or synthetic resins, such as chain-growth polymerization resins or step-growth polymerization resins, for example amino resins, in particular urea resins and melamine/formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

It is immaterial whether the high-molecular-weight organic compounds mentioned are present as plastic compositions, melts or in the form of spinning solutions, coatings, blends, paints or printing inks. Depending on the intended purpose, it may be advantageous to use the pigments obtained according to the invention as blends or in the form of preparations or dispersions. The pigments according to the invention are used in an amount of, preferably, 0.1 to 10%, relative to the high-molecular-weight organic material to be pigmented.

An aromatic alkyd melamine resin coating (AM) based on a medium-oil alkyd resin and a butanol-etherified melamine resin, a polyester coating (PE) based on cellulose acetobutyrate and a melamine resin, and a water-borne coating based on polyurethane (PUR) were chosen from the large number of known coatings for evaluation of the properties of the pigments prepared by the invention in the coatings sector.

Plasticized polyvinyl chloride (PVC) and polyolefin (PO) were chosen from the large number of known plastics for evaluation of the properties of the pigments produced by the invention in the plastics sector.

A gravure printing system based on nitrocellulose (NC printing) was chosen from the large number of known printing systems for evaluation of the properties of the pigments produced by the invention in the printing sector. The color strength and the hue were determined in accordance with DIN 55986. The rheology of the millbase after dispersion (millbase rheology) was rated in accordance with the following five-point scale:

5 thin liquid
4 liquid
3 viscous liquid
2 slightly solidified
1 solidified

After diluting the millbase to the final pigment concentration, the viscosity was evaluated using a Rossmann viscospatula, model 301, from Erichsen.

The gloss measurements were carried out on cast films at an angle of 20° in accordance with DIN 67530 (ASTMD 523) using a "multigloss" glossimeter from Byk-Mallinckrodt.

The pigments prepared according to the invention are suitable for use as colorants in electrophotographic toners and developers, such as, for example, one- or two-pack powder toners (also referred to as one- or two-pack developers), magnetic toners, liquid toners, polymerization toners and other special toners (L. B. Schein, "Electrophotography and Development Physics", Springer Series in Electrophysics 14, Springer Verlag, 2nd edition, 1992). Typical toner binders are chain-growth, polyaddition and step-growth polymerization resins, such as styrene, styrene/acrylate, styrene/butadiene, acrylate, polyester and phenol/epoxy resins, polysulfones, polyurethanes, individually or in combination, and polyethylene and polypropylene, which resins may additionally contain further ingredients, such as charge-control agents, waxes or flow control agents, or may be admixed with these ingredients later on.

Moreover, the pigments prepared according to the invention are suitable for use as colorants in powders and powder coatings, in particular in powder coatings which are applied by triboelectric or electrokinetic spraying and are used for surface-coating articles made, for example, of metal, wood, plastic, glass, ceramics, concrete, textile material, paper or rubber (J. F. Hughes, "Electrostatics Powder Coating" Research Study Press, John Wiley & Sons, 1984). The powder coating resins used are typically epoxy resins, carboxyl- and hydroxyl-containing polyester resins, polyurethane resins and acrylic resins, along with customary curing agents. Combinations of resins are also used. Thus, for example, epoxy resins are often used in conjunction with carboxyl- and hydroxyl-containing polyester resins. Examples of typical curing agent components (as a function of the resin system) are acid anhydrides, imidazoles and dicyandiamide and derivatives thereof, capped isocyanates, bisacylurethanes, phenolic resins and melamine resins, triglycidyl isocyanurates, oxazolines and dicarboxylic acids.

The pigments prepared according to the invention are also suitable for use as colorants in aqueous- and non-aqueous-based ink-jet inks and in inks which function by the hot-melt method.

The crystal phase of the crude pigments, prepigments, pigments, mixed crystal pigments and pigment preparations was determined by X-ray spectroscopy ($CuK_\alpha$ radiation).

In the above text and in the examples which follow, parts and percentages are in each case by weight.

$\alpha$-Phase quinacridone pigments are pigments having diffraction angles of 6.12, 12.36, 13.94, 25.59 and 27.94 (2 theta). $\beta$-Phase quinacridone pigments are pigments having diffraction angles of 5.65, 11.64, 15.89 and 26.99 (2 theta). Photographs of these X-ray diffraction diagrams are shown in EP-A-0,655,485. $\gamma$-Phase quinacridone pigments are pigments having diffraction angles of 6.35, 13.62, 23.69 and 26.25 (2 theta).

EXAMPLE 1

705.9 parts of polyphosphoric acid containing 84.3% of $P_2O_5$ are metered into an autoclave. This is followed by introduction of 141.2 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 1700 parts of 13.9% orthophosphoric acid in water at 140° C. with stirring under the pressure reached in the sealed vessel. This causes the temperature to rise to 170° C. The mixture is stirred at 170° C. for 0.5 hour. It is then cooled to 60° C., the resulting pigment is filtered off with suction, washed neutral with water, and dried at 80° C. This gives 126.5 parts of pigment (C.I. Pigment Violet 19, $\beta$-phase, containing traces of the $\alpha$-phase). If the reaction mixture is hydrolyzed below 110° C., the prepigment obtained is predominantly present in the $\alpha$-phase.

This pigment produces strong colorations in PVC and in polyolefin. Its dispersibility is very good and its bleeding fastness is excellent. In the AM coating, it produces hiding coatings of high color strength. The rheology rating is 5, and the viscosity is 4.0 s.

EXAMPLE 2

708.1 parts of polyphosphoric acid containing 83.5% of $P_2O_5$ are metered into an autoclave. This is followed by introduction of 141.6 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 1700 parts of 13.9% orthophosphoric acid at 140° C. with stirring under pressure. This causes the temperature to rise to 170° C. The mixture is cooled to 155° C. and stirred at 155° C. for 0.5 hour. It is then cooled to 60° C., the pigment is filtered off with suction, washed neutral with water, and dried at 80° C. This gives 126.9 parts of pigment (C.I. Pigment Violet 19, $\beta$-phase, containing traces of the $\alpha$-phase). In the AM coating, it produces hiding coatings of high color strength. The rheology rating is 4–5, and the viscosity is 3.9 s.

EXAMPLE 3

375 parts of methyl polyphosphate containing 84.0% of $P_2O_5$ are metered into an autoclave. This is followed by introduction of 75 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 140° C. with stirring under the pressure reached in the sealed vessel. This causes the temperature to rise to 155° C. The mixture is stirred at 155° C. for 0.5 hour. It is then cooled to 60° C., the pigment is filtered off with suction, washed neutral with water, and dried at 80° C. This gives 67.2 parts of pigment (C.I. Pigment Violet 19, $\beta$-phase, containing traces of the $\alpha$-phase) which produces transparent coatings of high color strength in the AM coating. The rheology rating is 3, and the viscosity is 4.2 s.

EXAMPLE 4

375 parts of polyphosphoric acid containing 85.0% of $P_2O_5$ are metered into an autoclave. This is followed by introduction of 75.0 parts of 2,5-dianilinoterephthalic acid and 4.2 parts of the pigment dispersant of the formula (II) at 80° to 90° C. with stirring and heating of the resulting mixture at 125° C. for 1 hour, during which ring closure to the quinacridone takes place. In this formula (II), P is the radical of a linear unsubstituted quinacridone and X is a phthalimidomethylene group (VI) in which $R^{10}$, $R^{11}$, $R^{12}$ and $R^{13}$ are each a hydrogen atom and m is 1.7. The reaction mixture is then metered into a second autoclave and hydrolyzed with 2250 parts of 30% phosphoric acid at 140° C. with stirring under the pressure reached in the sealed vessel. This causes the temperature to rise to 155° C. The mixture is stirred at 155° C. for 0.5 hour. It is then cooled to 60° C., the pigment preparation is filtered off with suction, washed neutral with water, and dried at 80° C. This gives 71.4 parts of pigment preparation (C.I. Pigment Violet 19, β-phase, containing traces of the α-phase) which produces transparent coatings of high color strength in the AM coating. The rheology rating is 5, and the viscosity is 3.9 s.

EXAMPLE 5

375 parts of polyphosphoric acid containing 85.0% of $P_2O_5$ are metered into an autoclave. This is followed by introduction of 75.0 parts of 2,5-dianilinoterephthalic acid and 4.2 parts of the pigment dispersant of the formula (II) at 80° to 90° C. with stirring and heating of the resulting mixture at 125° C. for 1 hour, during which ring closure to the quinacridone takes place. In this formula (II), P is the radical of a linear unsubstituted quinacridone and X is a phthalimidomethylene group (VI) in which $R^{10}$, $R^{11}$, $R^{12}$ and $R^{13}$ are each a hydrogen atom and m is 1.7. The reaction mixture is then metered into a second autoclave and hydrolyzed with 2250 parts of 30% phosphoric acid at 140° C. with stirring under the pressure reached in the sealed vessel. This causes the temperature to rise to 155° C. The mixture is stirred at 155° C. for 0.5 hour. It is then cooled to 60° C., the pigment preparation is filtered off with suction, washed neutral with water, and dried at 80° C. This gives 71.4 parts of pigment preparation (C. I. Pigment Violet 19, β-phase, containing traces of the α-phase). 28.5 parts of the pigment preparation are mixed with 1.5 parts of the pigment dispersant of the formula (II) by mechanical means. In this formula (II), P is the radical of a linear unsubstituted quinacridone and X is a sulfonamido group (V) in which $R^7$ is a hydrogen atom, $R^8$ and $R^9$ are each an ethyl group, n is 3.0, o is 1.0, and m is 2.0.

This gives a pigment preparation which produces transparent coatings of high color strength in the AM coating. The rheology rating is 5, the viscosity is 3.9 s, and the gloss measurement gives a value of 79.

EXAMPLE 6

250 parts of polyphosphoric acid containing 85.0% of $P_2O_5$ are metered into an autoclave. This is followed by introduction of 50 parts of 2,5-dianilinoterephthalic acid at 80° to 90° C. with stirring and heating of the resulting mixture at 125° C. for 1 hour, during which ring closure to the quinacridone takes place. The reaction mixture is then hydrolyzed in a static mixer, model Kenics KMR, 14.6 mm in diameter (supplier: H. Ott, Neckargmund, Germany) at a throughput of 120 parts by volume per hour with 20% phosphoric acid, which is metered in at a throughput of 480 parts per volume per hour, at 140° C. under pressure. During this procedure the temperature rises to 166° C. The hydrolysis mixture is cooled in an autoclave to 100° C. and stirred at this temperature for 1 hour. It is then cooled to 60° C., the pigment is filtered off with suction, washed neutral with water, and dried at 80° C.

This gives 44.3 parts of pigment (C.I. Pigment Violet 19, β-phase, containing traces of the α-phase). In the AM coating, it produces transparent coatings of high color strength. The rheology rating is 5, and the viscosity is 3.9 s.

EXAMPLE 7

375 parts of polyphosphoric acid containing 85.0% of $P_2O_5$ are metered into an autoclave. This is followed by introduction of 75 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of water at 140° C. with stirring under pressure. This causes the temperature to rise to 155° C. The mixture is stirred at 155° C. for 1 hour. It is then cooled to 60° C., the crude pigment is filtered off with suction, washed neutral with water, and dried at 80° C.

This gives 67.2 parts of coarsely crystalline pigment (Crude Pigment Violet 19, β-phase). A suspension comprising 77 parts of 1% sodium hydroxide solution, 6.3 parts of coarsely crystalline crude pigment (β-phase) and 0.32 part of the pigment dispersant of the formula (II) is metered into a stirred ball mill (manufacturer: Draiswerke GmbH, Mannheim, Germany) which has been charged with 336 parts of zirconium mixed oxide beads 0.3–0.4 mm in diameter as the grinding medium. In this formula (II), P is the radical of a linear unsubstituted quinacridone and X is a sulfonamido group (V) in which $R^7$ is a hydrogen atom, $R^8$ and $R^9$ are each an ethyl group, n is 3.0, o is 1.0, and m is 2.0. Milling is carried out at a rotational speed of the stirrer of 15.6 m/s and at a specific energy density of 3.1 kW per liter of milling space at 25° C. for 15 minutes. The millbase suspension is then removed from the grinding medium by screening, the grinding medium is rinsed with water, and the combined millbase suspensions are filtered off with suction, washed with water, and dried at 80° C.

This gives 6.3 parts of pigment preparation (C.I. Pigment Violet 19, β-phase) which produces transparent coatings of high color strength in the AM coating. The rheology rating is 5, the viscosity is 3.8 s, and the gloss measurement gives a value of 79.

EXAMPLE 8

772.3 parts of polyphosphoric acid containing 85.0% of $P_2O_5$ are metered into an autoclave. This is followed by introduction of 154.5 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2120 parts of 13.9% phosphoric acid at 140° C. with stirring under pressure. This causes the temperature to rise to 172° C. The mixture is cooled to 155° C. and stirred at this temperature for 0.5 hour. It is then cooled to 60° C., the crude pigment is filtered off with suction, washed neutral with water, and dried at 80° C. This gives 138.4 parts of coarsely crystalline pigment (Crude Pigment Violet 19, β-phase).

A suspension comprising 77 parts of 1% sodium hydroxide solution and 6.4 parts of coarsely crystalline crude pigment (β-phase) is metered into a stirred ball mill (manufacturer: Draiswerke GmbH, Mannheim, Germany) which has been charged with 336 parts of zirconium mixed oxide beads 0.3–0.4 mm in diameter as the grinding medium. Milling is carried out at a rotational speed of the stirrer of 15.6 m/s and at a specific energy density of 3.1 kW per liter of milling space at 25° C. for 15 minutes. The millbase suspension is then removed from the grinding medium by screening, the grinding medium is rinsed with water, and the combined millbase suspensions are filtered off with suction and washed with water. This gives 28.4 parts of prepigment presscake, pigment content: 22.5%, (β-phase). For the finishing operation, the presscake is introduced into 41.5 parts of water, and 3.3 parts of isobutanol and 0.65 part of 98% sodium hydroxide are added. The mixture is heated to boiling, stirred at the boiling temperature for 3 hours, and then the isobutanol is distilled off at the head until reaching 100° C. After cooling to 60° C., the pigment is filtered off with suction, washed neutral with water, and dried at 80° C. This gives 6.1 parts of pigment (C.I. Pigment Violet 19, β-phase).

In PVC and polyolefin, the pigment produces colorations of high color strength. Its dispersibility is very good and its bleeding fastness is excellent.

EXAMPLE 9

772.3 parts of polyphosphoric acid containing 85.0% of $P_2O_5$ are metered into an autoclave. This is followed by introduction of 154.5 parts of 2.5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2120 parts of 13.9% phosphoric acid at 140° C. with stirring under pressure. This causes the temperature to rise to 172° C. The mixture is cooled to 150° C. and stirred at this temperature for 0.5 hour. It is then cooled to 60° C., the crude pigment is filtered off with suction, washed neutral with water, and dried at 80° C. This gives 138.4 parts of coarsely crystalline β-phase pigment. Determination of quinacridone content: 10 parts of the crude pigment prepared as described above are introduced into 200 parts of concentrated sulfuric acid at <10° C. and dissolved. 56 parts of water are then added dropwise over a period of 1 hour. The mixture is then heated at 80° C. for 3 hours. It is allowed to cool to 25° C., and the precipitate is filtered off with suction, washed with 75% sulfuric acid until the run-off is clear, then washed neutral and dried at 80° C. This gives 9.75 parts of pure quinacridone. Thus, the quinacridone obtained is 97.5% pure.

A suspension comprising 77 parts of 1% sodium hydroxide solution, 6.4 parts of coarsely crystalline crude pigment (β-phase) and 0.32 part of the pigment dispersant of the formula (II) is metered into a stirred ball mill (manufacturer: Draiswerke GmbH, Mannheim, Germany) which has been charged with 336 parts of zirconium mixed oxide beads 0.3–0.4 mm in diameter as the grinding medium. In this formula (II), P is the radical of a linear unsubstituted quinacridone and X is a sulfonamido group (V) in which $R^7$ is a hydrogen atom, $R^8$ and $R^9$ are each an ethyl group, n is 3.0, o is 1.0, and m is 2.0. Milling is carried out at a rotational speed of the stirrer of 15.6 m/s and at a specific energy density of 3.1 kW per liter of milling space at 25° C. for 15 minutes. The millbase suspension is then removed from the grinding medium by screening, the grinding medium is rinsed with water, and the combined millbase suspensions are filtered off with suction, washed with water, and dried at 80° C. This gives 6.5 parts of pigment preparation (C.I. Pigment Violet 19, β-phase) which produces transparent coatings of high color strength in the AM coating. The rheology rating is 5, the viscosity is 3.0 s, the gloss measurement gives a value of 79.

In PE coating, the pigment produces transparent coatings of high color strength. The rheology rating is 3, and the viscosity is 2.9 s. In NC prints, the pigment produces transparent prints of high color strength and high gloss.

EXAMPLE 10

424 parts of polyphosphoric acid containing 85.0% of $P_2O_5$ are metered into an autoclave. This is followed by introduction of 84.8 parts of 2.5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 140° C. with stirring under pressure. This causes the temperature to rise to 157° C. The mixture is cooled to 145° C. and stirred at 145° C. for 5 hours. It is then cooled to 60° C., the crude pigment is filtered off with suction, washed neutral with water, and dried at 80° C.

This gives 76.0 parts of coarsely crystalline crude β-phase pigment. A suspension comprising 100 parts of 1% sodium hydroxide solution, 6.4 parts of coarsely crystalline crude pigment (β-phase) and 0.32 part of the pigment dispersant of the formula (II) is metered into a stirred ball mill (manufacturer: Draiswerke GmbH, Mannheim, Germany) which has been charged with 336 parts of zirconium mixed oxide beads 0.3–0.4 mm in diameter as the grinding medium. In this formula (II), P is the radical of a linear unsubstituted quinacridone and X is a sulfonamido group (V) in which $R^7$ is a hydrogen atom, $R^8$ and $R^9$ are each an ethyl group, n is 3.0, o is 1.0, and m is 2.0. Milling is carried out at a rotational speed of the stirrer of 15.6 m/s and at a specific energy density of 3.1 kW per liter of milling space at 25° C. for 15 minutes. The millbase suspension is then removed from the grinding medium by screening, the grinding medium is rinsed with water, and the combined millbase suspensions are filtered off with suction, washed with water, and dried at 80° C. This gives 6.0 parts of pigment preparation (C.I. Pigment Violet 19, β-phase). It produces transparent coatings of high color strength in the AM coating. The rheology rating is 5, and the viscosity is 3.0 s.

EXAMPLE 11

392.8 parts of polyphosphoric acid containing 85.0% of $P_2O_5$ are metered into an autoclave. This is followed by introduction of 78.6 parts of 2.5-dianilinoterephthalic acid and 4.2 parts of the pigment dispersant of the formula (II) at 80° to 90° C. with stirring and heating of the resulting mixture at 125° C. for 1 hour, during which ring closure to the quinacridone takes place. In this formula (II), P is the radical of a linear unsubstituted quinacridone and X is a sulfonic acid group (IV) in which M is a hydrogen ion and m is 1.7. The reaction mixture is then metered into a second autoclave and hydrolyzed with 2250 parts of 30% phosphoric acid at 140° C. with stirring under pressure. This causes the temperature to rise to 155° C. The mixture is stirred at 155° C. for 0.5 hour. It is then cooled to 60° C., the prepigment preparation is filtered off with suction and washed with water.

This gives 351.2 parts of prepigment preparation (presscake, pigment content: 20.1 %, β-phase containing traces of the α-phase). For the finishing operation, 100 parts of presscake are introduced into 100 parts of water, and 60 parts of 85% isobutanol and a solution comprising 0.67 part of aluminum sulfate x 18 $H_2O$ and 10 parts of water are added. The pH is set at 1 to 2 by adding 1 part of 10% sulfuric acid. The mixture is heated to boiling, stirred at the boiling temperature for 3 hours, and then the isobutanol is distilled off at the head until reaching 100° C. After cooling to 60° C., the pigment preparation is filtered off with suction, washed neutral with water, and dried at 80° C. This gives 20.7 parts of pigment preparation (C.I. Pigment Violet 19, β-phase). This pigment preparation contains the pigment dispersant of the formula (II) in which P is the radical of a linear unsubstituted quinacridone and X is a sulfonic acid group (IV) in which M is an aluminum ion and m is 1.7. This pigment produces coatings of high color strength in the AM coating. The rheology rating is 5, and the viscosity is 3.3".

EXAMPLE 12

392.8 parts of polyphosphoric acid containing 85.0% of $P_2O_5$ are metered into an autoclave. This is followed by introduction of 78.6 parts of 2,5-dianilinoterephthalic acid and 4.2 parts of the pigment dispersant of the formula (II) at 80° to 90° C. with stirring and heating of the resulting mixture at 125° C. for 1 hour, during which ring closure to the quinacridone takes place. In this formula (II), P is the radical of a linear unsubstituted quinacridone and X is a sulfonic acid (IV) in which M is a hydrogen ion and m is 1.7. The reaction mixture is then metered into a second autoclave and hydrolyzed with 2250 parts of 30% phosphoric acid at 140° C. with stirring under pressure. This causes the temperature to rise to 155° C. The mixture is stirred at 155° C. for 0.5 hour. It is then cooled to 60° C., the prepigment preparation is filtered off with suction and washed neutral with water. This gives 351.2 parts of a 20.1% prepigment preparation in the form of a presscake (β-phase containing traces of the α-phase). For the finishing operation, 100 parts of this presscake are introduced into 100 parts of water, and 60 parts of 85% isobutanol and a solution comprising 1.33 parts of a natural resin mainly composed of abietylamine, 1.33 parts of 98% formic acid and 20 parts of water are added. The mixture is heated to boiling, stirred at the boiling temperature for 3 hours, and then the isobutanol is distilled off at the head until reaching 100° C. After cooling to 60° C., the pigment preparation is filtered off with suction, washed neutral with water, and dried at 80° C.

This gives 21.5 parts of pigment preparation (C.I. Pigment Violet 19, β-phase). This pigment preparation contains the pigment dispersant of the formula (II) in which P is the radical of a linear unsubstituted quinacridone and X is a sulfonic acid group (IV) in which M is a cycloaliphatically substituted ammonium group based on a natural resin predominantly composed of abietylamine and m is 1.7. This pigment produces coatings of high color strength in the AM coating. The rheology rating is 5, and the viscosity is 3.4".

EXAMPLE 13

383 parts of polyphosphoric acid containing 85.0% of $P_2O_5$ are metered into an autoclave. This is followed by introduction of 76.6 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid and 80 parts of isoamyl alcohol at 155° C. with stirring under pressure. This causes the temperature to rise to 170° C. The mixture is cooled to 155° C. and stirred at this temperature for 0.5 hour. It is then cooled to 90° C., and the isoamyl alcohol is distilled off at the head until reaching 100° C. The mixture is cooled to 60° C., the crude pigment is filtered off with suction, washed neutral with water, and dried at 80° C.

This gives 68.7 parts of coarsely crystalline crude β-phase pigment. A suspension comprising 100 parts of water, 6.4 parts of coarsely crystalline crude pigment (β-phase) and 0.32 part of the pigment dispersant of the formula (II) is metered into a stirred ball mill (manufacturer: Draiswerke GmbH, Mannheim, Germany) which has been charged with 336 parts of zirconium mixed oxide beads 0.3–0.4 mm in diameter as the grinding medium. In this formula (II), P is the radical of a linear unsubstituted quinacridone and X is a sulfonamido group (V) in which $R^7$ is a hydrogen atom, $R^8$ and $R^9$ are each an ethyl group, n is 3.0, o is 1.0, and m is 2.0. Milling is carried out at a rotational speed of the stirrer of 15.6 m/s and at a specific energy density of 3.1 kW per liter of milling space at 25° C. for 15 minutes. The millbase suspension is then removed from the grinding medium by screening, the grinding medium is rinsed with water, and the combined millbase suspensions are filtered off with suction, washed with water, and dried at 80° C. This gives 5.9 parts of pigment preparation (C.I. Pigment Violet 19, β-phase). It produces coatings of high color strength in the AM coating. The rheology rating is 5, and the viscosity is 2.8".

EXAMPLE 14

385 parts of polyphosphoric acid containing 85.0% of $P_2O_5$ are metered into an autoclave. This is followed by introduction of 77.0 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid and 2.7 parts of 65% alkanesulfonate in water at 140° C. with stirring under pressure. This causes the temperature to rise to 155° C. The mixture is stirred at 155° C. for 0.5 hour. It is then cooled to 60° C., the crude pigment is filtered off with suction, washed neutral with water, and dried at 80° C. This gives 69.0 parts of coarsely crystalline surface-treated crude β-phase pigment. A suspension comprising 95 parts of water, 5 parts of 100% isobutanol, and 6.4 parts of coarsely crystalline crude pigment (β-phase) is metered into a stirred ball mill (manufacturer: Draiswerke GmbH, Mannheim, Germany) which has been charged with 336 parts of zirconium mixed oxide beads 0.3–0.4 mm in diameter as the grinding medium. Milling is carried out at a rotational speed of the stirrer of 15.6 m/s and at a specific energy density of 3.1 kW per liter of milling space at 25° C. for 15 minutes. The millbase suspension is then removed from the grinding medium by screening and the grinding medium is rinsed with water. The isobutanol is distilled off from the combined millbase suspensions at the head until reaching 100° C. The mixture is cooled to 60° C., the surface-treated pigment is filtered off with suction, washed with water, and dried at 80° C.

This gives 6.3 parts of surface-treated pigment (C.I. Pigment Violet 19, β-phase). In the AM coating, this pigment produces transparent coatings of high color strength. The rheology rating is 5, and the viscosity is 4.4".

EXAMPLE 15

427.5 parts of polyphosphoric acid containing 85.0% of $P_2O_5$ are metered into an autoclave. This is followed by introduction of 85.5 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 140° C. with stirring under pressure. This causes the temperature to rise to 155° C. The mixture is stirred at this temperature for 0.5 hours. It is then cooled to 60° C., the crude pigment is filtered off with suction, washed neutral with water, and dried at 80° C.

This gives 398.2 parts of crude pigment presscake, pigment content: 19.2%, β-phase. A suspension comprising 65 parts of water, 0.9 part of 98% sodium hydroxide and 33.3 parts of coarsely crystalline crude pigment presscake (pigment content: 19.2%, β-phase) is metered into a stirred ball mill (manufacturer: Draiswerke GmbH, Mannheim, Germany) which has been charged with 336 parts of zirconium mixed oxide beads 0.3–0.4 mm in diameter as the grinding medium. Milling is carried out at a rotational speed of the stirrer of 15.6 m/s and at a specific energy density of 3.1 kW per liter of milling space at 25° C. for 15 minutes. The millbase suspension is then removed from the grinding medium by screening. This gives 96 parts of prepigment in the form of a millbase suspension (pigment content: 6.4%, β-phase).

For the finishing treatment, 6.0 parts of n-butanol are added to this millbase suspension. The mixture is heated to boiling, stirred at the boiling temperature for 3 hours, and then the n-butanol is distilled off at the head until reaching 100° C. After cooling to 60° C., the pigment is filtered off with suction, washed neutral with water, and dried at 80° C.

This gives 5.2 parts of pigment (C.I. Pigment Violet 19, β-phase). In the PUR coating, this pigment produces transparent coatings of high color strength.

EXAMPLE 16

772.3 parts of polyphosphoric acid containing 83.5% of $P_2O_5$ are metered into an autoclave. This is followed by introduction of 154.5 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2120 parts of 13.9% phosphoric acid at 140° C. with stirring under pressure. This causes the temperature to rise to 172° C. The mixture is cooled to 155° C. and stirred at this temperature for 0.5 hour. It is then cooled to 60° C., the crude pigment is filtered off with suction, washed neutral with water, and dried at 80° C.

This gives 138.4 parts of coarsely crystalline crude β-phase pigment.

A mixture comprising 25.0 parts of coarsely crystalline crude pigment (β-phase) and 0.75 part of xylene is poured into a steel vessel which has been charged to 55% of its volume with 3370 parts of steel balls 10 mm in diameter as the grinding medium. Milling is carried out at 75% of the critical rotational speed on a roller gear table. The millbase is then separated from the grinding medium by screening. The millbase is stirred in 220 parts of water, and the xylene is distilled off at the head until reaching 100° C. The mixture is cooled to 60° C., the pigment is filtered off with suction, washed with water, and dried at 80° C.

This gives 21.3 parts of pigment (C.I. Pigment Violet 19, β-phase). In the AM coating, this pigment produces hiding coatings.

EXAMPLE 17

337.6 parts of polyphosphoric acid containing 81.3% of $P_2O_5$ are metered into an autoclave. This is followed by introduction of 67.5 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 130° C. with stirring under pressure. This causes the temperature to rise to 145° C. The mixture is stirred at 145° C. for 0.5 hour. It is then cooled to 60° C., the prepigment is filtered off with suction, washed neutral with water, and dried at 80° C.

This gives 343.8 parts of prepigment presscake, pigment content: 17.6%, which is a mixture of the α-phase and the β-phase. If the above reaction mixture is hydrolyzed at a lower temperature, an α-phase prepigment is obtained.

For the finishing operation, 170.5 parts of prepigment presscake are placed in a stirred vessel. This is followed by addition of 159.5 parts of water, 3.0 parts of 98% sodium hydroxide and 90 parts of isobutanol. The mixture is heated to 150° C. under pressure and stirred at this temperature for 5 hours. It is then cooled to 90° C., and the isobutanol is distilled off at the head until reaching 100° C. The mixture is then cooled to 90° C., and a solution comprising 8.0 parts of water and 0.44 part of sodium peroxodisulfate is added at this temperature. The resulting supension is stirred at 90° C. for 1 hour. It is then cooled to 60° C., the pigment is filtered off with suction, washed neutral with water, and dried at 80° C.

This gives 27.7 parts of pigment (C.I. Pigment Violet 19, β-phase). In the AM coating, this pigment produces transparent coatings of high color strength. The rheology rating is 4–5, and the viscosity is 3.8". As a result of the addition of the sodium peroxodisulfate solution, the pigment produces deeper coatings in the pure shade and a more bluish hue than the same pigment prepared without adding the sodium peroxodisulfate solution.

EXAMPLE 18

710 parts of polyphosphoric acid containing 83.0% of $P_2O_5$ are metered into an autoclave. This is followed by introduction of 142 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 1700 parts of 13.9% phosphoric acid at 140° C. with stirring under pressure. This causes the temperature to rise to 170° C. The mixture is cooled to 150° C. and stirred at this temperature for 0.5 hour. It is then cooled to 60° C., the prepigment is filtered off with suction and washed neutral with water.

This gives 649.9 parts of prepigment presscake, pigment content: 19.6%, β-phase containing a small amount of α-phase.

For the finishing operation, 204.1 parts of prepigment presscake are placed into a stirred vessel. This is followed by addition of 345.2 parts of water and 41.5 parts of 33% sodium hydroxide solution. The mixture is heated to 150° C. under pressure and stirred at this temperature for 5 hours. It is then cooled to 90° C., 36.5 parts of 96.5% ethanol are added, and the resulting mixture is heated to boiling for 2 hours. It is then cooled to 60° C., and 8.2 parts of a 10% aqueous alkylphenolpolyglycol ether sulfate solution are added. The mixture is stirred at 60° C. for 2 hours. The pH is then adjusted to 2 by adding 34.9 parts of 31% hydrochloric acid, the resulting mixture is stirred at 60° C. for 1 hour, the surface-treated pigment is filtered off with suction, washed neutral with water, and dried at 80° C.

This gives 34.7 parts of surface-treated pigment (C.I. Pigment Violet 19, β-phase).

In the AM coating, this pigment produces coatings of high color strength. The rheology rating is 4–5, and the viscosity is 3.8".

EXAMPLE 19

429 parts of polyphosphoric acid containing 85.0% of $P_2O_5$ are metered into an autoclave. This is followed by introduction of 76.9 parts of 2,5-dianilinoterephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 110° C. with stirring under pressure. This causes the temperature to rise to 125° C. The mixture is stirred at 125° C. for 0.5 hour. It is then cooled to 60° C., the prepigment is filtered off with suction and washed neutral with water.

This gives 395.8 parts of prepigment presscake, pigment content: 19.4%, α-phase containing a small percentage of β-phase.

For the finishing treatment, 51.5 parts of the 19.4% prepigment presscake are introduced into 200 parts of N-methylpyrrolidone and stirred. This is followed by heating the mixture to 125° C. and stirring it at this temperature for 2 hours while distilling off water. The remaining mixture is then cooled to 25° C., the pigment is filtered off with suction, washed with water until free of N-methylpyrrolidone, and dried at 80° C.

This gives 9.45 parts of pigment (C.I. Pigment Violet 19, γ-phase). In the AM coating, this pigment produces coatings of high color strength. The rheology rating is 3–4, and the viscosity is 4.4".

EXAMPLE 20

367.3 parts of polyphosphoric acid containing 85.0% of $P_2O_5$ are metered into an autoclave. This is followed by introduction of 73.5 parts of 2,5-di(4-toluidino)terephthalic acid at 80° to 90° C. with stirring and heating of the resulting mixture at 125° C. for 1 hour, during which ring closure to the quinacridone takes place. The reaction mixture is then metered into a second autoclave and hydrolyzed with a mixture of 2250 parts of 30% phosphoric acid and 100 parts of xylene at 140° C. with stirring under pressure. This causes the temperature to rise to 155° C. The mixture is stirred at this temperature for 0.5 hour. It is then cooled to 90° C., and the xylene is distilled off at the head until reaching 100° C. The mixture is cooled to 60° C., the pigment is filtered off with suction, washed neutral with water, and dried at 80° C.

This gives 66.4 parts of pigment (C.I. Pigment Red 122).

28.5 parts of pigment are mixed with 1.5 parts of the pigment dispersant of the formula (II) by mechanical means. In this formula (II), P is the radical of a linear unsubstituted quinacridone and X is a sulfonamido group (V) in which $R^7$ is a hydrogen atom, $R^8$ and $R^9$ are each an ethyl group, n is 3.0, o is 1.0, and m is 2.0. This gives a pigment preparation which produces very transparent coatings of high color strength in the AM coating. The rheology rating is 5, and the viscosity is 3.8 s.

EXAMPLE 21

369.5 parts of polyphosphoric acid containing 85.0% of $P_2O_5$ are metered into an autoclave. This is followed by introduction of 18.6 parts of 2,5-dianilinoterephthalic acid and 55.3 parts of 2,5-di(4-toluidino)terephthalic acid at 80° to 90° C. with stirring and heating of the resulting mixture at 125° C. for 1 hour, during which ring closure to the quinacridone takes place. The reaction mixture is then metered into a second autoclave and hydrolyzed with a mixture of 2250 parts of 30% phosphoric acid and 100 parts of chlorobenzene at 140° C. with stirring under pressure. This causes the temperature to rise to 155° C. The mixture is stirred at 155° C. for 0.5 hour. It is then cooled to 90° C., and the chlorobenzene is distilled off at the head until reaching 100° C. The mixture is cooled to 60° C., the mixed crystal pigment is filtered off with suction, washed neutral with water, and dried at 80° C.

This gives 66.7 parts of mixed crystal pigment. The spectrum of the mixed crystal pigment is available: 5.43, 10.96, 13.99 and 27.16 [2 theta]. The typical reflections of the unsubstituted quinacridone cannot be detected. This pigment produces transparent coatings of high color strength in the AM coating. The rheology rating is 1–2, and the viscosity is 4.3 s.

EXAMPLE 22

556 parts of polyphosphoric acid containing 85.0% of $P_2O_5$ are metered into an autoclave. This is followed by introduction of 79.4 parts of 2,5-di(2-chloro-anilino) terephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 140° C. with stirring under pressure. This causes the temperature to rise to 155° C. The mixture is stirred at 155° C. for 0.5 hour. It is then cooled to 60° C., the pigment is filtered off with suction, washed neutral with water, and dried at 80° C.

This gives 72.6 parts of pigment of the formula (I) in which $R^1$ is a hydrogen atom and $R^2$ is a chlorine atom. This pigment produces transparent coatings of high color strength in the AM coating. The rheology rating is 4, and the viscosity is 4.4 s.

EXAMPLE 23

365 parts of polyphosphoric acid containing 85.0% of $P_2O_5$ are metered into an autoclave. This is followed by introduction of 73.0 parts of 2,5-di(3-chloro-4-methylanilino)terephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 140° C. with stirring under pressure. This causes the temperature to rise to 155° C. The mixture is stirred at 155° C. for 0.5 hour. It is then cooled to 60° C., the pigment is filtered off with suction, washed neutral with water, and dried at 80° C.

This gives 67.1 parts of the pigment of the formula (I) in which $R^1$ is a chlorine atom and $R^2$ is a methyl group. 28.5 parts of pigment are mixed with 1.5 parts of the pigment dispersant of the formula (II) by mechanical means. In this formula (II), P is the radical of a linear unsubstituted quinacridone and X is a sulfonamido group (V) in which $R^7$ is a hydrogen atom, $R^8$ and $R^9$ are each an ethyl group, n is 3.0, o is 1.0, and m is 2.0.

This gives a pigment preparation which produces very transparent coatings of high color strength in the AM coating.

EXAMPLE 24

367.6 parts of polyphosphoric acid containing 85.0% of $P_2O_5$ are metered into an autoclave. This is followed by introduction of 73.5 parts of 2,5-di(3-chloro-anilino) terephthalic acid at 80° to 90° C. with stirring and heating of the resulting mixture at 125° C. for 1 hour, during which ring closure to the quinacridone takes place. The reaction mixture is then metered into a second autoclave and hydrolyzed with a mixture of 2250 parts of 30% phosphoric acid and 100 parts of xylene at 140° C. with stirring under pressure. This causes the temperature to rise to 155° C. The mixture is stirred at 155° C. for 0.5 hour. It is then cooled to 90° C., and the xylene is distilled off at the head until reaching 100° C. The pigment is then filtered off with suction, washed neutral with water, and dried at 80° C.

This gives 67.2 parts of pigment (C.I. Pigment Red 209). This pigment produces transparent coatings of high color strength in the AM coating. The rheology rating is 5, and the viscosity is 4.2 s.

EXAMPLE 25

352 parts of polyphosphoric acid containing 85.0% of $P_2O_5$ are metered into an autoclave. This is followed by introduction of 70.4 parts of 2,5-di(4-N-methyl-carboxamidoanilino)terephthalic acid at 80° to 90° C. with stirring and heating of the resulting mixture at 125° C. for 1 hour, during which ring closure to the quinacridone takes place. The reaction mixture is then metered into a second autoclave and hydrolyzed with 2250 parts of 30% phosphoric acid at 140° C. with stirring under pressure. This causes the temperature to rise to 155° C. The mixture is stirred at 155° C. for 0.5 hour. It is then cooled to 60° C., and the pigment is filtered off with suction, washed neutral with water, and dried at 80° C.

This gives 66.8 parts of the pigment of the formula (I) in which $R^1$ is a hydrogen atom and $R^2$ is an N-methylcarboxamido group. This pigment produces coatings of high color strength in the AM coating. The rheology rating is 5, and the viscosity is 3.9 s.

We claim:

1. A process for preparing pigments, mixed crystal pigments and pigment preparations based on linear unsubstituted or substituted quinacridones of the formula (I)

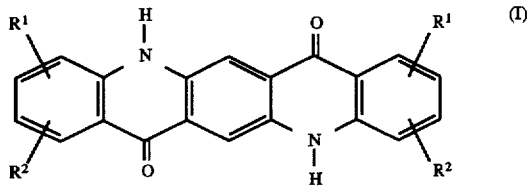

in which the substituents $R^1$ and $R^2$ are identical or different and are hydrogen, chlorine, bromine or fluorine atoms or are $C_1$–$C_4$-alkyl, $C_1$–$C_4$-alkoxy or carboxamido groups which are optionally substituted by $C_1$–$C_6$-alkyl groups; or are phenoxy or $C_6$–$C_{10}$-aryl rings onto which optionally further aromatic, aliphatic or heterocyclic rings are fused, which process comprises a cyclization of a dianilinoterephthalic acid of the formula (Ia)

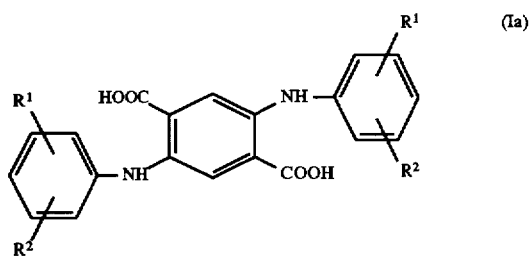

with polyphosphoric acid or polyphosphate, hydrolyzing the reaction mixture resulting from said cyclization at a temperature of or above 110° C. with water or an aqueous mineral acid solution and then isolating the pigments thus obtained, directly; or subjecting the resulting prepigments, if desired after addition of organic solvents, to a finishing treatment and isolating the pigments; or subjecting the resulting coarsely crystalline crude pigments to fine dispersion and then isolating the pigments; or subjecting the prepigments obtained after fine dispersion, if desired after addition of organic solvents, to a finishing treatment and isolating the pigments.

2. The process as claimed in claim 1, wherein cyclization of the dianilinoterephthalic acid with polyphosphoric acid or polyphosphates is carried out at 80° to 150° C.

3. The process as claimed in claim 1, wherein cyclization of the dianilinoterephthalic acid with polyphosphoric acid or polyphosphates is carried out at 120° to 140° C.

4. The process as claimed in claim 1, wherein a 3- to 10-fold amount of polyphosphoric acid or polyphosphate, relative to the weight of the dianilinoterephthalic acid, is used for the cyclization.

5. The process as claimed in claim 1, wherein the reaction mixture resulting from cyclization is hydrolyzed with water or an aqueous orthophosphoric acid solution at 110° to 180° C., under pressure.

6. The process as claimed in claim 1, wherein the reaction mixture resulting from cyclization is hydrolyzed with water or an aqueous orthophosphoric acid solution at 135° to 165° C., under pressure.

7. The process as claimed in claim 1, wherein the reaction mixture resulting from cyclization is hydrolyzed in a static mixer.

8. The process as claimed in claim 1, wherein organic solvents, surface-active agents and/or pigment dispersants are added at any desired stage of the process.

9. The process as claimed in claim 1, wherein the coarsely crystalline crude pigments obtained after hydrolysis are subjected to dry or wet milling.

10. The process as claimed in claim 9, wherein the coarsely crystalline crude pigments are subjected to wet milling in a liquid, aqueous, aqueous-organic or organic medium in a stirred ball mill at an energy density of more than 2.5 kW per liter of milling space and a rotational speed of the stirrer of more than 12 m/s while being exposed to a grinding medium having a diameter of less than 1 mm until fine dispersion is reached.

11. The process as claimed in claim 1, wherein the finishing treatment of the prepigments is carried out with alkanols or carboxamides.

12. The process as claimed in claim 1, wherein the finishing treatment of the prepigments is carried out at temperatures of 50° to 200° C. for 1 to 24 hours.

13. The process as claimed in claim 1, wherein addition is made at any desired time in the process of one or more pigment dispersants of the formula (II)

$$P\text{—}X_m \quad (II),$$

in which

P is an m-valent radical of a linear quinacridone of the formula (I), in which $R^1$ and $R^2$ are identical and are hydrogen atoms or methyl groups, X is a group of the formula (III)

$$\text{—COOM} \quad (III)$$

or a group of the formula (IV)

$$\text{—SO}_3M \quad (IV),$$

in which

M is a hydrogen ion $H^+$ or the equivalent $M^{r+}/r$ of an r-valent metal cation in which r in the relevant case is consistently 1, 2, or 3; or an ammonium ion having the structure $N^+R^3R^4R^5R^6$, in which the substituents $R^3$, $R^4$, $R^5$ and $R^6$ are each, independently of one another, hydrogen atoms, $C_1$–$C_{30}$-alkyl, $C_2$–$C_{30}$-alkenyl or $C_5$–$C_{30}$-cycloalkyl groups which are optionally substituted by hydroxyl, di($C_1$–$C_4$-alkyl)amino, carboxyl or carboxamido groups; or X is a group of the formula (V)

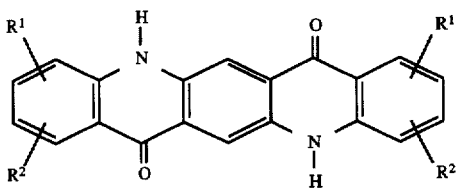
(I)

in which $R^8$ and $R^9$ are each, independently of one another, a hydrogen atom, a $C_1$–$C_{20}$-alkyl, $C_2$–$C_{20}$-alkenyl or $C_5$–$C_7$-cycloalkyl group, or in which $R^8$ and $R^9$ together with the adjacent nitrogen atom form an aliphatic or aromatic five- or six-membered heterocyclic system containing in each case 1 to 3 identical or different hetero atoms in the ring selected from the group consisting of nitrogen, oxygen and sulfur, $R^7$ is a hydrogen atom or a $C_1$–$C_4$-alkyl group, n is a number from 1 to 6, o is 0 or 1; or X is a group of the formula (VI)

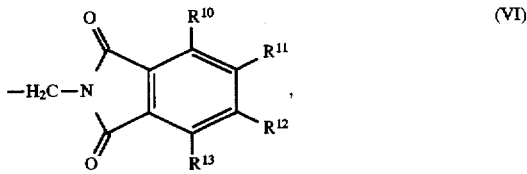
(VI)

in which $R^{10}$, $R^{12}$ and $R^{13}$ are each a hydrogen, fluorine, chlorine or bromine atom and $R^{11}$ is a hydrogen, fluorine, chlorine or bromine atom or a nitro, $C_1$–$C_5$-alkyl, $C_1$–$C_6$-alkoxy or benzoylamino group; and m is a number from 1 to 4.

14. The process as claimed in claim 13, wherein between 0.1 and 20% by weight of pigment dispersant is added per weight unit of crude pigment, prepigment or pigment.

15. The process as claimed in claim 13, wherein between 3 to 10% by weight of pigment dispersant is added per weight unit of crude pigment, prepigment or pigment.

16. The process as claimed in claim 1, wherein 1 to 20% by weight of a peroxodisulfate, relative to the weight of the pigment, is added before or after the finishing treatment.

* * * * *